United States Patent [19]

Hauser et al.

[11] Patent Number: 4,610,341
[45] Date of Patent: Sep. 9, 1986

[54] FLUID FRICTION CLUTCH

[75] Inventors: Kurt Hauser, Stuttgart; Werner Hümmel, Affalterbach, both of Fed. Rep. of Germany

[73] Assignee: Sueddeutsche Kuehlerfabrik Julius Fr. Behr GmbH & Co. KG, Fed. Rep. of Germany

[21] Appl. No.: 627,558

[22] Filed: Jul. 3, 1984

[30] Foreign Application Priority Data

Jul. 9, 1983 [DE] Fed. Rep. of Germany ....... 3324924

[51] Int. Cl.⁴ .............................................. F16D 35/00
[52] U.S. Cl. ................. 192/58 B; 192/82 T; 192/85 R
[58] Field of Search ................ 192/58 R, 58 B, 82 T, 192/85 R

[56] References Cited

U.S. PATENT DOCUMENTS

| | | | |
|---|---|---|---|
| 3,215,235 | 11/1965 | Kamm | 192/58 B |
| 3,848,622 | 11/1974 | Cummings, III | 192/82 T X |
| 4,488,628 | 12/1984 | Kluna et al. | 192/58 B |

FOREIGN PATENT DOCUMENTS 005927 5/1979 European Pat. Off. .

Primary Examiner—Rodney H. Bonck
Assistant Examiner—Alan G. Towner
Attorney, Agent, or Firm—Barnes & Thornburg

[57] ABSTRACT

A fluid friction clutch is disclosed which has a working chamber formed by an output component in which a driving disk that is connected with an input component can rotate. For the adjustment of the degree of clutching, the working chamber can be filled by fluid supplied from a reservoir chamber developed as a pressure chamber and connected with the working chamber via a fluid connection, such as a pipe, a borehole, or similar means. This fluid connection is developed in such a way that, by means of admitting compressed air to the reservoir chamber, fluid can be delivered in a controlled manner from said reservoir chamber into the working chamber. A fluid friction clutch of this type has not movable mechanical valve parts, which is particularly advantageous when the compressed air is admitted to the reservoir chamber in surges, which would result in a rapid wear in the case of the known embodiments.

21 Claims, 5 Drawing Figures

FLUID FRICTION CLUTCH

BACKGROUND AND SUMMARY OF THE INVENTION

The present invention relates to a fluid friction clutch of the type having a housing defining a working chamber and a reservoir or storage chamber, primary and secondary parts mounted for relative rotation with respect to each other and exhibiting working surfaces disposed in the working chamber, and a fluid connection for accommodating flow of viscous fluid from the reservoir chamber to the working chamber to control the fluid drive connection between the working surfaces of the primary and secondary parts.

More specifically, preferred embodiments of this invention relate to such fluid friction clutches having a working chamber formed by an output component in wich a driving disk is rotatably arranged, the driving disk being firmly connected with an input component, and wherein said working chamber, for adjustment of the degree of clutching, can selectively be filled with and emptied of a viscous fluid taken from the reservoir chamber by means of a fluid connection existing between the reservoir chamber and the working chamber.

A fluid friction clutch of this type is known, for example, from German Utility Model No. (DE-GM) 81 26 744. For filling the working chamber with fluid, a valve lever is provided that can cover and expose a borehole provided in an intermediate plate separating the reservoir chamber from the working chamber. This valve lever is pivoted in the reservoir chamber and can, at its end that faces away from the borehole, be acted upon by a force via the membrane of a pressure chamber. The introduction of pressure into the pressure chamber therefore causes a force to be exerted on the valve lever, by means of which said valve lever, against the force of a pressure spring, moves away from the borehole between the reservoir chamber and the working chamber and thus clears the path of the fluid from the reservoir chamber into the working chamber. This borehole can therefore be opened or closed through the action of pressure and thus vary the filling of the working chamber with fluid and therefore the degree of clutching. Naturally, fluid return means must also be provided in this case in order to pump the fluid back from the working chamber into the storage chamber. However, the development of these specific fluid return means is not the object of the present invention and are therefore not discussed in detail.

The above-noted type of development of a fluid friction clutch has the disadvantage that for the filling of the working chamber with fluid, movable mechanical parts—especially a valve lever—must be provided. These mechanical parts and in particular, their bearings or support connections, are subject to wear. After a certain time, they therefore have to be exchanged which requires that the whole clutch be removed. The wear limit will be reached especially fast when the filling of the working chamber is controlled through short and frequent pressure surges since the mechanical parts in this case must carry out a large number of movements per time unit.

An object of the invention is to provide a fluid friction clutch of the above-mentioned type that contains few or no moving mechanical parts, in particular, valve parts, and which therefore is not subject to wear. Another objective is to design such a clutch which permits stable intermediate operating speeds.

These objects are achieved according to the invention by developing the reservoir chamber as a pressure chamber, by arranging the opening of the fluid connection on the side of the reservoir chamber at a larger radial distance from the rotational axis of the clutch than the fluid level of the fluid ring formed in the reservoir chamber during the rotation of the output component, and by developing the fluid connection between the reservoir chamber and the working chamber in such a way that an overflowing of fluid from the reservoir chamber into the working chamber cannot take place when the reservoir chamber is without pressure. The reservoir chamber is preferably acted upon by a pneumatic pressure. Via the opening of the fluid connection on the side of the reservoir chamber, fluid will therefore be pumped into the working chamber. The filling of the working chamber is therefore controlled pneumatically, without movable valve parts. The life of this type of clutch is much longer than that of the known embodiments resulting in the saving of maintenance and repair costs. In addition, while the working chamber is being filled with fluid, the pressure existing in the reservoir chamber simultaneously results in a retarding of the return flow from the working chamber into the storage chamber via the return-flow pipe, or other connection so that the filling of the working chamber takes place more rapidly.

For the development of the fluid connection between the reservoir chamber and the working chamber, several advantageous embodiments are contemplated by the present invention. All these embodiments ensure that, when the reservoir chamber is without pressure, no fluid can come into the working chamber from the storage chamber. In one advantageous preferred embodiment, the fluid connection is developed as a pressure control valve. In this case, the radial position of the outlet opening does not affect the functioning.

Another advantageous embodiment provides that the fluid connection is developed as an overflow duct. In order to prevent that fluid flows from the reservoir chamber into the working chamber when the reservoir chamber is without pressure, the outlet opening of this overflow duct on the side of the working chamber is arranged with less radial distance to the rotational axis of the clutch than the fluid ring level formed in the rotating reservoir chamber. This is at least necessary when a fluid with a relatively low viscosity, i.e., good flow characteristics, is used. A different situation arises when highly viscous fluids, such as silicone fluids with viscosity values of over 10,000 cSt are used. Such viscosities are sufficient so that an overflowing of this fluid from the reservoir chamber without pressure into the working chamber will also be prevented when the outflow opening of the overflow duct on the side of the working chamber is arranged at a larger radial distance to the rotational axis of the clutch than the fluid level on the side of the reservoir chamber.

Other advantageous embodiments of the invention provide that the overflow duct connecting the reservoir chamber with the working chamber is developed in such a way that it has increased flow resistance. When the flow resistance is higher than the fluid pressure of the fluid ring forming during the rotation of the output component in the storage chamber, the radial position of the outlet opening on the side of the working chamber is not critical.

In general, the following should be considered concerning the radial position of the outlet opening of the fluid connection on the side of the working chamber when an overflowing of fluid from the reservoir chamber without pressure into the working chamber is to be avoided. The outlet opening of the fluid connection on the side of the working chamber may have a larger radial distance from the rotational axis of the clutch than the fluid level of the fluid ring forming during the rotation of the output component in the storage chamber when:

(a) a pressure control valve is provided;
(b) the fluid has a high viscosity, and/or
(c) the fluid connection has an increased flow resistance.

In other cases, on the other hand, it is required to arrange the outlet opening of the fluid connection on the side of the working chamber in such a way that it has less radial distance to the rotational axis of the clutch than the fluid ring on the side of the reservoir chamber.

An advantageous embodiment of the invention provides that the overflow duct is a pipe which is fastened in a pressure-sealed manner at a wall separating the working chamber from the reservoir chamber, preferably at an intermediate plate. In comparison with the known fluid friction clutches, this embodiment constructively is designed especially simply because in the case of the known clutches, considerable expenditures for components are requred for the movable mechanical valve parts. It is advantageous in this case if the pipe is bent in a U-shaped or V-shaped manner, with both legs pointing away from the rotational axis of the clutch. The fluid located in the storage chamber can therefore only enter into the working chamber through such a pipe when the storage chamber is pressurized. Embodiments are also contemplated where the pipe is shaped differently, where it has to be observed that at least one section of this pipe is at less radial distance from the rotational axis of the clutch than the fluid level in the reservoir chamber so that no fluid can reach the working chamber from the reservoir chamber when the reservoir chamber is not under pressure.

Another advantageous embodiment of the invention provides that the overflow duct consists of a borehole provided in an intermediate plate separating the working chamber from the reservoir chamber. This solution is even more advantageous with respect to manufacturing and expenditure of material. Concerning the development of this borehole, the same considerations apply as in the case of the use of a pipe. It is especially expedient to develop the borehole in a V-shaped manner, the two legs of said V pointing away from the rotational axis of the clutch.

The pressure feed for the reservoir chamber may be developed in a known way. It is especially advantageous to admit compressed air to the reservoir chamber via a pressure feed device arranged on its front side. However, the reservoir chamber may also be supplied with compressed air via a borehole provided in a shaft connected with the input component, according to the contemplated embodiments. The pressure feeding in this case takes place from the direction of the input side and not from the direction of the output side. The shaft connected with the input component may also be led through an intermediate plate separating the storage chamber from the working chamber, by means of a slide ring sealing.

The advantages of a fluid friction clutch constructed according to the invention are especially significant when pressure is admitted to the storage chamber in surges. The reason is that the mechanical valve parts of the known embodiments in this case are subjected to considerable wear. In the case of this method of operation, it is advantageous to control the degree of fluid admission to the clutch working chamber by the variation of the pressure surge frequency and/or the duration of the pressure surges and/or the side of the pressure surges. The cooling water temperature of a motor vehicle may, in this case, for example, be used as a reference control variable.

It is desirable that in the case of an unintentional transfer of pressure from the reservoir chamber, no excess pressure is built up in the working chamber. For this purpose it is advantageous according to certain preferred embodiments to arrange in the working chamber a pressure release borehole at the level of the axis of the clutch on the side of the working chamber that faces away from the reservoir chamber. Since the fluid contained in the working chamber, during rotation of the clutch, forms a ring, it cannot escape through this pressure release borehole. An additional safety means is provided when the pressure release borehole has a relief valve.

Further objects, features, and advantages of the present invention will become more apparent from the following description when taken with the accompanying drawings which show, for purposes of illustration only, several embodiments in accordance with the present invention.

BRIEF DESCRIPTION OF THE DRAWINGS

FIG. 1a is a partial sectional schematic view illustrating a feature of a preferred embodiment constructed in accordance with the present invention;

FIG. 4 is a partial sectional schematic view through a fluid friction clutch constructed according to another advantageous embodiment of the invention, where pressure is fed to reservoir chamber via shaft of primary part.

DETAILED DESCRIPTION OF THE DRAWINGS

Figure 1:
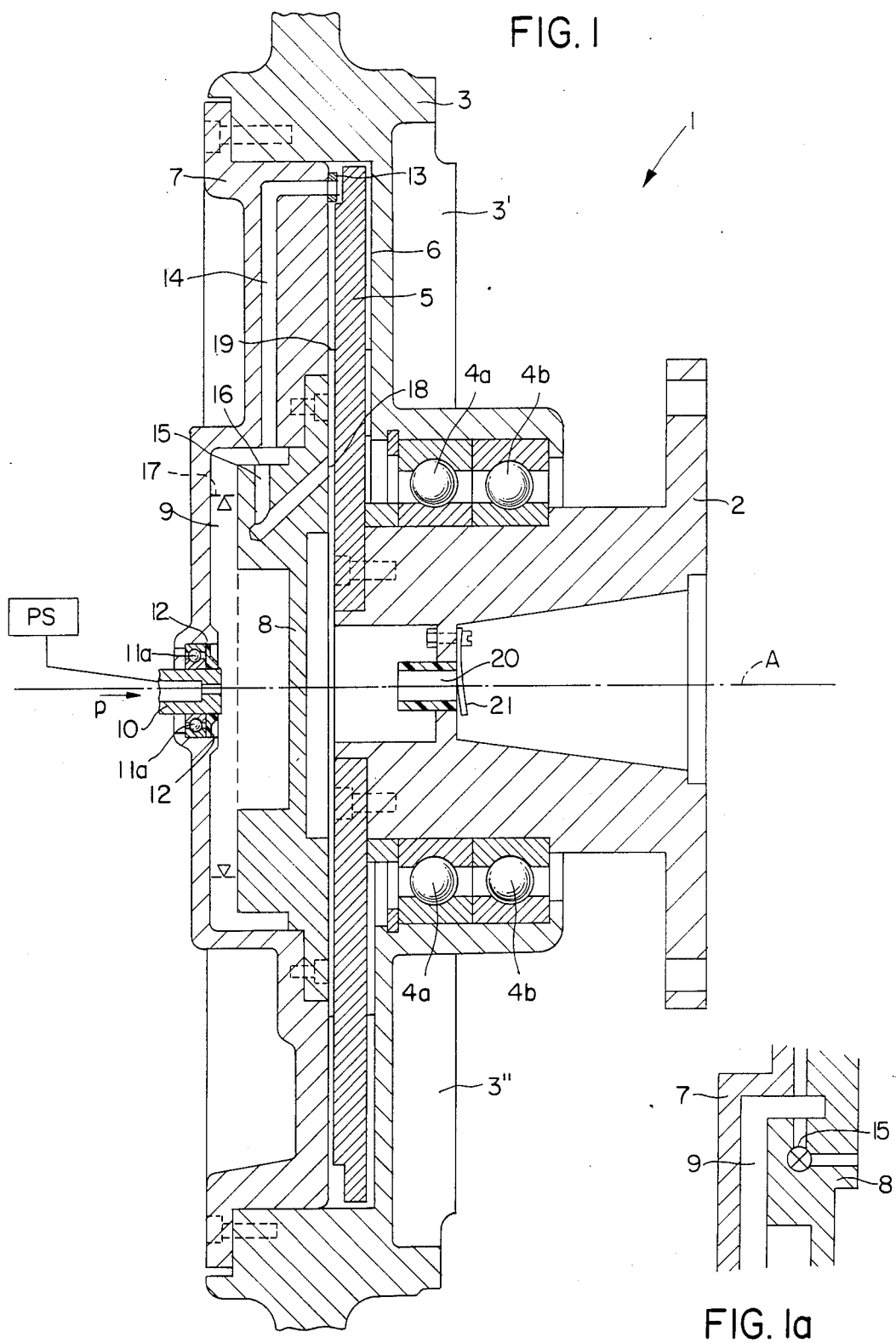
FIG. 1 is a partial sectional schematic view through a fluid friction clutch constructed according to a preferred embodiment of the invention, where the fluid connection is developed as a borehole.

The whole fluid friction clutch constructed according to the invention and illustrated in FIG. 1 is identified by the reference number 1 and comprises an input component in the form of input flange 2 and an output component in the form of clutch housing 3, provided with cooling fins 3' and 3". The input flange 2 is rotatably supported with respect to the clutch housing 3 via roller bearing rings 4a and 4b. Flange 2 carries a driving disk 5 which rotates in a working chamber 6 formed by the clutch housing 3. For the transfer of the torque, the working chamber 6 is filled with a viscous fluid, the transfer of the torque being the better, the more fluid is located in the working chamber 6. By means of the degree of filling of the working chamber 6, the degree of clutching between the input component and the output component can therefore be adjusted.

The clutch housing 3 is firmly connected with the clutch cover 7 which itself carries an intermediate plate 8. The clutch cover 7 and the intermediate plate 8 enclose a storage or reservoir chamber 9, developed as a pressure chamber. The pressure feed to chamber 9 takes place via a connecting piece 10 to which pressure is fed from schematically depicted pressure source PS in the direction of the Arrow p. Connecting piece 10 is rotatably supported at the clutch cover 7, for example, via the roller bearing 11a and is sealed via the seals 12.

A pumping means 13 and a return flow borehole 14 provided in the cover 7 of the clutch provide the return of the fluid contained in the working chamber 6 to the storage chamber 9. This pumping means and the return flow ducts may be developed using known techniques and constructions and are therefore not further described herein.

A V-shaped borehole 15 is provided for the transfer of the fluid from the reservoir chamber 9 into the working chamber 6. This borehole 15 is configured in such a way that its opening 16, on the side of the storage chamber 9, is in contact with the fluid ring formed during the rotation of the clutch in the storage chamber 9. The lowest point of the V formed by the borehole 15 is located at less radial distance from the rotational axis A of the clutch than the fluid level—reference number 17 in FIG. 1—of the fluid ring on the side of the reservoir chamber when filled to its maximum design level. Borehole 15 has an opening 18 on the side of the working chamber 6. The fluid level of the fluid ring, on the side of the working chamber, is depicted by the reference number 19. When pneumatic pressure is admitted to the reservoir chamber 9, fluid flows from the reservoir chamber 9 into the working chamber 6. This therefore results in a changing of the degree of filling of the working chamber and thus of the torque transferred by the driving disk 5 to the clutch housing 3. No mechanical components are required for the feeding of the liquid clutch fluid, especially no valve parts. The return of the fluid from the working chamber 6 to the reservoir chamber 9, as shown above, takes place in the conventional way via the pumping means 13 and the return flow borehole 14. If excess pressure exists in the reservoir chamber 9, i.e., when fluid is being delivered into the working chamber 6 via the borehole 15, this excess pressure existing in the reservoir chamber simultaneously has the result that the return flow is retarded or interrupted via the return flow pipe 14 so that a perfect control is achieved.

FIG. 1a schematically depicts an alternate preferred embodiment which configures the fluid connection means 15 as an excess pressure valve.

The admitting of pneumatic pressure to the storage chamber 9 preferably takes place in surges from schematically depicted pressure control supply PS. The amount of fluid delivered into the working chamber 6, in this case, can be changed via the frequency and/or duration or size of the pressure surges. The pressure control supply PS is of conventional design. In this case, the nonexistence of movable mechanical components is especially advantageous because in the known prior arrangements with such mechanical components, such would be subjected to considerable wear through frequent load changes in the event pneumatic pressure surges were used.

In the case of an unintentional pressure equalization between the reservoir chamber and the working chamber 6, it is to be prevented that the air is compressed in the working chamber 6. For this purpose, a pressure release borehole 20 is provided at the level of the clutch axis A on the side of the working chamber 6 facing away from the reservoir chamber 9. This pressure release borehole 20 is closed by an relief valve 21 which opens the working chamber 6 under excess pressure. This valve 21 also prevents the flowing of oil (clutch fluid) out of the clutch during transport.

The feeding of compressed air to the reservoir chamber 9 can take place in other than the shown manner via a connecting piece 10, according to other preferred embodiments. According to one preferred embodiment, the input flange 2 can be connected with an input shaft which, by means of a slide ring sealing, is led through the intermediate plate 8 and which, via a borehole provided in it, is used for the feeding of compressed air.

Figure 2:
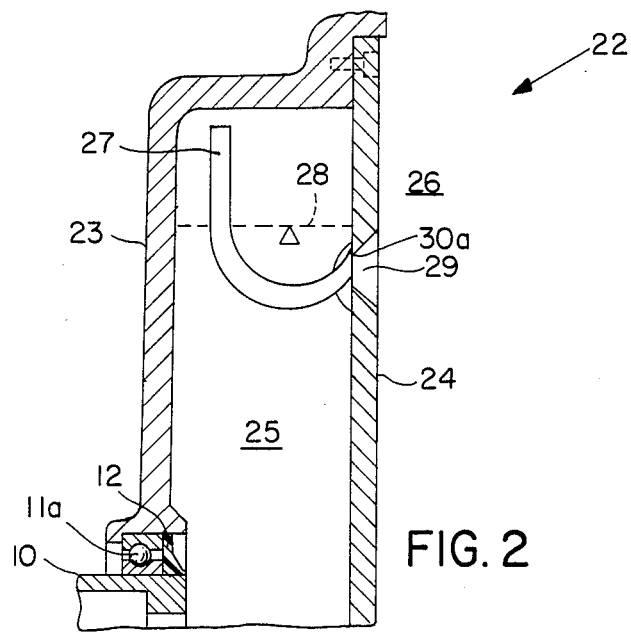
FIG. 2 is a partial sectional schematic view through a part of another embodiment of the invention, where the fluid connection is developed as a bent pipe.

Another embodiment of the invention is shown partly in FIG. 2 and as a whole has the reference number 22. The shown part of the clutch cover has the reference number 23 and the intermediate plate has the reference number 24. The pressure feed into the reservoir chamber 25 may be developed identically or similarly to the embodiment of FIG. 1 and therefore has the same reference numbers. For the filling of the working chamber 26 with fluid from the reservoir chamber 25, a U-shaped pipe 27 is provided. The opening of pipe 27 on the reservoir chamber side is in contact with the fluid ring formed in the storage chamber and the bent part has less radial distance to the rotational axis of the clutch than the fluid level 28 of this fluid ring forming in the reservoir chamber, even in the case of a maximum filling (design limit) of this reservoir chamber. The pipe 27 is connected via a borehole 29 with the working chamber 26 and is fastened at the intermediate plate in a pressure-sealed manner by means of a welding seam 30a. Concerning the delivery of fluid from the reservoir chamber into the working chamber, the same conditions and considerations apply as in the case of the embodiment of FIG. 1.

Figure 3:
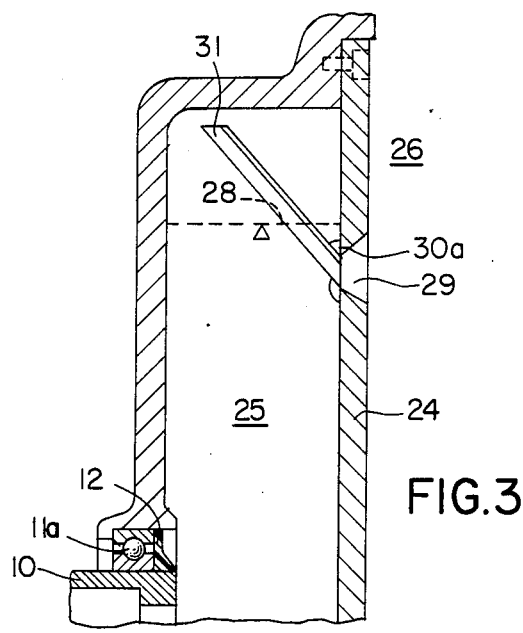
FIG. 3 is a partial sectional schematic view through a part of yet another embodiment of the invention, where the fluid connection is developed as a straight pipe.

Based on the embodiment of FIG. 2 and partly using the same reference numbers, FIG. 3 shows another embodiment. The only difference with respect to the embodiments shown in FIG. 2 is the fact that the pipe 31 is not bent like the pipe 27 of FIG. 2, but is straight. This type of embodiment also meets the demands of the fluid friction clutch according to the invention.

Although the present invention has been described and illustrated in detail, it is to be clearly understood that the same is by way of illustration and example only, and is not to be taken by way of limitation. The spirit and scope of the present invention are to be limited only by the terms of the appended claims.

A further advantageous embodiment of the invention is illustrated in FIG. 4. Pressure feed to reservoir chamber 43 takes place via a coaxial borehole 42 within the shaft 41 of the primary member 40, i.e. from the backside of the clutch. Shaft 41 extends into the pressure chamber 43 and is sealed against the intermediate plate 45 by sliding ring seal 44 which thereby separates reservoir chamber 43 and working chamber 6. Pressure is supplied by pressure source PS via connecting piece 46 in the direction of the arrow p.

What is claimed is:

1. A fluid friction clutch comprising:

housing means defining a working chamber means, and a reservoir chamber means, primary and secondary parts mounted for relative rotation with respect to each other and exhibiting working surfaces disposed in said working chamber means, fluid connection means for accommodating flow of viscous fluid means from the reservoir chamber means to the working chamber means to control the fluid drive connection between the working surfaces of the primary and secondary parts, and fluid return means for returning said fluid means from the working chamber means to said reservoir chamber means, wherein said reservoir chamber means is a pressure chamber, wherein the fluid connection means opens into the reservoir chamber means at a radial distance from the clutch rotational axis which is larger than the radial distance from the clutch axis to a fluid ring formed in the reservoir means during rotation thereof, and wherein said fluid return means is located radially outwardly of the fluid connection means, and wherein said fluid connection means is configured to prevent flow of viscous fluid means from the reservoir chamber means to the working chamber means when the reservoir chamber means is not pressurized.

2. A fluid friction clutch according to claim 1, wherein the fluid connection means is configured as an excess pressure valve.

3. A fluid friction clutch according to claim 1, wherein the fluid connection means is configured as an overflow duct.

4. A fluid friction clutch according to claim 3, wherein the overflow duct has an increased flow resistance.

5. A fluid friction clutch according to claim 1, wherein the fluid connection means opens to the working chamber means at a radial distance from the clutch axis which is smaller than the radial distance from the clutch axis to the fluid ring.

6. A fluid friction clutch according to claim 1, wherein said fluid connection means is configured as a tube which is connected in a pressure sealed manner at intermediate plate means separating the reservoir chamber means and the working chamber means.

7. A fluid friction clutch according to claim 6, wherein the tube is configured with a U or V shape having both legs pointing away from the clutch axis.

8. A fluid friction clutch according to claim 1, wherein the fluid connection means is configured as a borehole provided as an overflow duct arranged at an intermediate plate means separating the reservoir chamber means and the working chamber means.

9. A fluid friction clutch according to claim 8, wherein the borehole is configured with a V shape having both legs of the V pointing away from the clutch axis.

10. A fluid friction clutch according to claim 1, comprising compressed air supply means at the front side of the reservoir chamber means for accommodating supply of compressed air thereto.

11. A fluid friction clutch according to claim 1, comprising a shaft supported at the primary part and containing a borehole for supplying compressed air to the reservoir chamber means.

12. A fluid friction clutch according to claim 11, wherein the shaft is sealed by means of a sliding ring seal in an intermediate plate means separating the reservoir chamber means and the working chamber means.

13. A fluid friction clutch according to claim 1, comprising pressure applying means for applying pressure in surges to the reservoir chamber means.

14. A fluid friction clutch according to claim 13, wherein pressure surge control means are provided for varying the degree of filling of the clutch by varying at least one of the frequency, duration and magnitude of the surges.

15. A fluid friction clutch according to claim 14, wherein the pressure surge control means includes means for controlling the surges as a function of a reference variable, such as the cooling water temperature of a motor vehicle.

16. A fluid friction clutch according to claim 1, wherein a pressure release borehole means is provided at a side of the working chamber means opposite the reservoir chamber means and at the level of the clutch axis.

17. A fluid friction clutch according to claim 16, wherein the pressure release borehole means is provided with an relief valve.

18. A fluid friction clutch comprising:

housing means defining a working chamber means, and a reservoir chamber means, primary and secondary parts mounted for relative rotation with respect to each other and exhibiting working surfaces disposed in said working chamber means, and fluid connection means for accommodating flow of viscous fluid means from the reservoir chamber means to the working chamber means to control the fluid drive connection between the working surfaces of the primary and secondary parts, wherein said reservoir chamber means is a pressure chamber, wherein the fluid connection means opens into the reservoir chamber means at a radial distance from the clutch rotational axis which is larger than the radial distance from the clutch axis to a fluid ring formed in the reservoir means during rotation thereof, and wherein said fluid connection means is configured to prevent flow of viscous fluid means from the reservoir chamber means to the working chamber means when the reservoir chamber means is not pressurized, and wherein said fluid connection means is configured as a tube which is connected in a pressure sealed manner at intermediate plate means separating the reservoir chamber means and the working chamber means.

19. A fluid friction clutch according to claim 18, wherein the tube is configured with a U or V shape having both legs pointing away from the clutch axis.

20. A fluid friction clutch comprising:

housing means defining a working chamber means, and a reservoir chamber means, primary and secondary parts mounted for relative rotation with respect to each other and exhibiting working surfaces disposed in said working chamber means, fluid connection means for accommodating flow of viscous fluid means from the reservoir chamber means to the working chamber means to control the fluid drive connection between the working surfaces of the primary and secondary parts, wherein said reservoir chamber means is a pressure chamber, wherein the fluid connection means opens into the reservoir chamber means at a radial distance from the clutch rotational axis which is larger than the radial distance from the clutch axis to a fluid ring formed in the reservoir means during rotation thereof, and wherein the fluid connection means is configured as a bore hole provided as an overflow duct arranged at an intermediate plate means separating the reservoir chamber means and the working chamber means.

21. A fluid friction clutch according to claim 20, wherein the bore hole is configured with a V shape having both legs of the V pointing away from the clutch axis.

* * * * *